United States Patent [19]

Kaminsky et al.

[11] Patent Number: 5,204,429
[45] Date of Patent: Apr. 20, 1993

[54] PROCESS FOR THE PREPARATION OF AN OLEFIN POLYMER

[75] Inventors: Walter Kaminsky, Pinneberg; Regina Spiehl, Hamburg, both of Fed. Rep. of Germany

[73] Assignee: Hoechst Aktiengesellschaft, Frankfurt am Main, Fed. Rep. of Germany

[21] Appl. No.: 228,543

[22] Filed: Aug. 4, 1988

[30] Foreign Application Priority Data

Aug. 7, 1987 [DE] Fed. Rep. of Germany ....... 3726325

[51] Int. Cl.⁵ .................. C08F 32/04; C08F 4/642
[52] U.S. Cl. .................... 526/308; 526/281; 526/160
[58] Field of Search ................. 526/308, 281

[56] References Cited

U.S. PATENT DOCUMENTS

| | | | |
|---|---|---|---|
| 3,366,616 | 1/1968 | Tietz | 526/308 |
| 4,542,199 | 9/1985 | Kaminsky | |
| 4,769,510 | 9/1988 | Kaminsky et al. | 526/160 |
| 4,794,096 | 12/1988 | Ewen | 526/160 |

FOREIGN PATENT DOCUMENTS

| | | | |
|---|---|---|---|
| 0185918 | 7/1986 | European Pat. Off. | |
| 61-221206 | 10/1986 | Japan | 526/160 |
| 967836 | 8/1964 | United Kingdom | |

OTHER PUBLICATIONS

Boor et al., Die Makromolekulare Chemie 90 (1966) 26–37.
Kaminsky Die Angewandte Makromolekulare Chemie, Band 145/146, 1986, 149–160.

Primary Examiner—Edward J. Smith

[57] ABSTRACT

Crystalline, isotactic homopolymers of cycloolefins or elastic copolymers made from cycloolefins and linear olefins are obtained, without ring opening of the cycloolefins, at industrially favorable polymerization temperatures by means of a catalyst which comprises a stereorigid, chiral metallocene compound of groups IVb to VIb of the Periodic Table of the Elements and an aluminoxane.

4 Claims, No Drawings

PROCESS FOR THE PREPARATION OF AN OLEFIN POLYMER

The present invention relates to a process for the preparation of homopolymers and copolymers of cycloolefins, in which the cycloolefin rings are not opened.

It is known that cycloolefins can be polymerized by means of various Ziegler catalysts. However, ring opening occurs in most of these cases. In addition, highly isotactic polycycloolefins are not obtained.

In addition, it is known that exclusively atactic polymer is obtained in the polymerization of propylene when a catalyst based on bis-cyclopentadienyl compounds of zirconium and aluminoxane are used (cf. U.S. Pat. No. 4,542,199).

Finally, highly isotactic polypropylene can be prepared by means of soluble, stereorigid, chiral zirconium compounds (cf. EP-A 185,918).

The object was to find a polymerization process in which cyclic olefins can be polymerized isotactically with retention of the ring even using other linear olefins.

It has been found that the object can be achieved if the catalyst used is a stereorigid, chiral metallocene compound together with an aluminoxane.

The present invention therefore relates to a process for the preparation of an olefin polymer by means of polymerization of 80 to 100% by weight, relative to the total amount of the monomers, of a cycloolefin of the formula

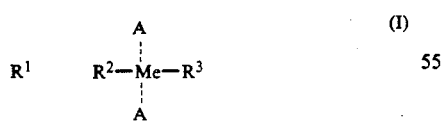

in which n is a number from 2 to 10, and 0 to 20% by weight, relative to the total amount of the monomer, of a $C_2$—to $C_{28}$—1—olefin or $C_4$—to $C_{28}$—diolefin, in solution, in suspension or in the gas phase, at a temperature from $-60°$ to $150°$ C., at a pressure from 0.5 to 64 bar, in the presence of a catalyst which comprises a transition metal compound and an aluminoxane, wherein the polymerization is carried out in the presence of a catalyst the transition metal compound of which is a metallocene compound of the formula I

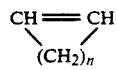 (I)

$$R^1 \quad R^2—Me—R^3$$

in which
  Me is a transition metal of groups IVb to VIb of the Periodic Table of the Elements,
  A is a mononuclear or polynuclear, asymmetrical hydrocarbon radical,
  $R^1$ denotes a $C_1$—to $C_4$—alkylene radical and $R^2$ and $R^3$ are identical or different and denote a halogen atom or a $C_1$—to $C_6$—alkyl radical, and where the aluminoxane has the formula II

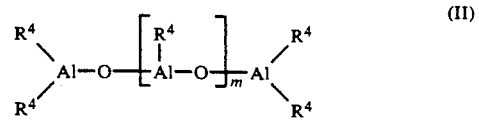 (II)

for the linear type and/or has the formula III

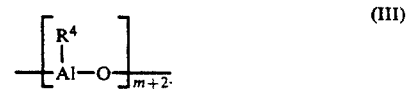 (III)

for the cyclic type, and, in the formulae II and III, $R^4$ denotes a $C_1$-$C_6$—alkyl group and m is an integer from 20 to 40, and to the polymer prepared by this process.

In the formula I $$R^1 \quad R^2—Me—R^3 \quad (I)$$

of the metallocene compound, Me is a transition metal of group IVb, Vb or VIb of the Periodic Table of the Elements, for example titanium, zirconium, hafnium, vanadium, tantalum, chromium, molybdenum or tungsten. Titanium and zirconium, in particular zirconium, are preferred.

A is a mononuclear or polynuclear, asymmetrical hydrocarbon radical, for example an indenyl ligand or an unsubstituted or substituted cyclopentadiene ligand or a benzene ligand or a cyclooctatetraene ligand, preferably an indenyl ligand or a substituted cyclopentadiene ligand.

$R^1$ is a $C_1$—to $C_4$—alkylene radical, preferably a $C_2$—alkylene radical.

$R^2$ and $R^3$ are identical or different and denote a halogen atom or a $C_1$—to $C_6$—alkyl radical, preferably a chlorine atom.

The racemate, but also the R—or S—form, of ethylenebis(indenyl)zirconium dichloride or ethylenebis(4,5,6,7—tetrahydro—1—indenyl)zirconium dichloride is particularly preferred.

The second component of the catalyst according to the invention is an aluminoxane of the formula II

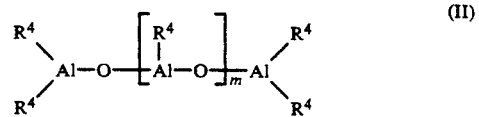 (II)

for the linear type and/or of the formula III

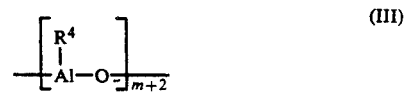 (III)

for the cyclic type. In these formulae, $R^4$ denotes a $C_1$-$C_6$—alkyl group, preferably methyl, ethyl or isobutyl, in particular methyl, and m denotes an integer from 2 to 40, preferably 10 to 20.

The aluminoxane can be prepared in various ways.

In one of the processes, finely powdered copper sulfate pentahydrate is slurried in toluene and, in a glass flask under an inert gas, sufficient trialkylaluminum is added at about $-20°$ C. so that about 1 mole of $CuSO_4.5H_2O$ is available per 4 Al atoms. After slow hydrolysis with elimination of alkane, the reaction mixture is kept at room temperature for 24 to 48 hours, cooling being necessary in some cases so that the temperature does not exceed 30° C. The copper sulfate is subsequently filtered off from the aluminoxane dissolved in the toluene, and the toluene is removed by distillation in vacuo.

In addition, aluminoxanes are obtained when trialkylaluminum, preferably trialkylaluminum, dissolved in an inert aliphatic or aromatic solvent, preferably heptane or toluene, is reacted with aluminum salts, preferably aluminum sulfate, containing water of crystallization at a temperature from $-20°$ to $100°$ C. During this reaction, the volume ratio between the solvent and the alkylaluminum used is 1:1 to 50:1—preferably 5:1—and the reaction time, which can be monitored by means of the elimination of the alkane, is 1 to 200 hours—preferably 10 to 40 hours.

Of aluminum salts containing water of crystallization, those are used, in particular, which have a high content of water of crystallization. Aluminum sulfate hydrate, above the compounds $Al_2(SO_4)_3.18H_2O$ and $Al_2(SO_4)_3.16H_2O$ having the particularly high content of water of crystallization of 18 and 16 moles of $H_2O$/mole of $Al_2(SO_4)_3$ respectively, is particularly preferred.

The catalyst to be used according to the invention is employed for homopolymerization and copolymerization of cycloolefins of the formula

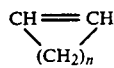

in which n is a number from 2 to 10, preferably 3, 5 or 6, in particular 3. Examples are cyclobutene, cyclopentene, cyclohexene, cycloheptene and cyclooctene, preferably cyclopentene, cycloheptene and cyclooctene, in particular cyclopentene. The cycloolefins mentioned may be polymerized alone or in a mixture or alternately.

The comonomers employed are $C_2$—to $C_{28}$—, preferably $C_2$—to $C_{10}$—, in particular $C_2$—to $C_6$—1—olefins or $C_4$—to $C_{28}$—, preferably $C_4$—to $C_{12}$—diolefins. Examples are ethylene, propylene, 1—butene, 1—hexene, 4—methyl—1—pentene, 1—octene, 1,4—butadiene and norbornadiene. Ethylene, propylene, 1—butene, 1—hexene and 1—octene, in particular ethylene and propylene, are preferred 1—olefins and butadiene is the preferred diolefin.

80 to 100, preferably 90 to 100, mol-% of the cycloolefin, relative to the total amount of the monomers, and 0 to 20, preferably 0 to 10, mol-% of the linear comonomers, relative to the total amount of the monomers, are employed.

The polymerization is carried out in an inert solvent which is customary for the Ziegler low-pressure process, for example in an aliphatic or cycloaliphatic hydrocarbon; examples which may be mentioned are butane, pentane, hexane, heptane, isooctane, cyclohexane and methylcyclohexane. In addition, it is possible to use a gasoline or hydrogenated diesel oil fraction which has been carefully freed from oxygen, sulfur compounds and moisture. Toluene can also be used. Finally, it is also possible to use the monomers to be polymerized as the solvent or suspending agent. The molecular weight of the polymer can be regulated in a known manner; hydrogen is preferably used for this purpose.

Polymerization is carried out in a known manner in suspension or in the gas phase, continuously or batchwise, in one step or in several steps, at a temperature from $-60°$ to $150°$ C., preferably $-20°$ to $80°$ C. The pressure is 0.5 to 64 bar. Polymerization in the industrially particularly important pressure range from 5 to 64 bar is preferred.

In the polymerization, the metallocene compound is used in a concentration, based on the transition metal, from $10^{-3}$ to $10^{-7}$, preferably $10^{-4}$ to $10^{-6}$, mole of transition metal per $dm^3$ of solvent or per $dm^3$ of reactor volume. The aluminoxane is used in a concentration from $10^{-4}$ to $10^{-1}$, preferably $10^{-3}$ to $2 \times 10^{-2}$, mole per $dm^3$ of solvent or per $dm^3$ of reactor volume, relative to the content of aluminum. In principle, however, higher concentrations are also possible.

Compared with the known state of the art, the process according to the invention is distinguished by the fact that the zirconium compounds preferably used are very temperature-stable in dilute solution, meaning that they can also be used at temperatures up to 80° C.

During the preparation of copolymers, the molar ratios between the cycloolefin and the 1—olefin employed can be varied within a broad range. The incorporation rate of the comonomer can be controlled virtually as desired by choice of the polymerization temperature, the concentration of the catalyst components and the molar ratio employed. A reduction in the polymerization temperature is associated with an increase in the incorporation rate of cycloolefins.

The mean molecular weight of the copolymer formed can be varied in a known manner by varying the catalyst concentration or the temperature. The virtually full independency of the molecular weight on the initial monomer ratio is particularly notable.

The polydispersity $M_w/M_n$ of the copolymers is, at values between 2.9 and 6.0 (4.5), extremely narrow, but differs markedly from the molecular weight distributions of the polyethylenes and polypropylenes prepared using this catalyst system, i.e. $M_w/M_n=2$. This results in a property profile for the polymers which makes them particularly suitable for injection molding.

The process according to the invention enables, for the first time, the preparation of highly isotactic homopolymers in which the monomer rings are fully retained and for which the following structure can be concluded, on the basis of solid IR and NMR spectroscopic analyses and X-ray analyses:

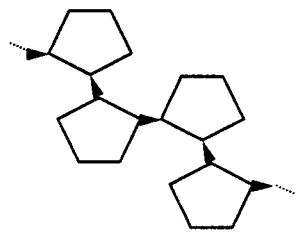

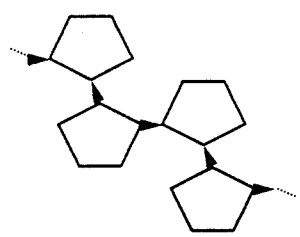

Astonishingly, these homopolymers are distinguished by the melting point, which is surprisingly high for polyolefins, above the decomposition temperature of above 250° C. In contrast to the amorphous polypentenamers prepared using the known catalysts, the isotactic polycyclopentene, in particular, is distinguished by unusually sharp X-ray defraction lines and thus high crystallinity. The polymer has high resistance to all customary solvents.

The invention is described in greater detail below with reference to examples:

EXAMPLE 1

Preparation of methylaluminoxane 44.3 g of $Al_2(SO_4)_3 \cdot H_2O$ (0.056 mol, corresponding to 1 mol of $H_2O$) were suspended in 250 cm³ of toluene, 50 cm³ of trimethylaluminum (0.52 mol) were added, and the mixture was reacted at 20° C. After a reaction time of 30 hours, about 0.9 mol of methane had been evolved. The solid aluminum sulfate was subsequently removed from the solution by filtration. By stripping off the toluene, 19.7 g of methylaluminoxane were obtained. The yield was 63% of theory. The mean molecular weight, determined cryoscopically in benzene, was 1170. The mean degree of oligomerization was about 16.

EXAMPLE 2

Preparation of ethylenebis(indenyl)zirconium dichloride

The preparation took place analogously to that described in Journal of Organometallic Chemistry, 232 (1982) 233-247.

EXAMPLE 3

100 cm³ of cyclopentene, 200 mg of aluminoxane and 5 cm³ of a rac-ethylene(bisindenyl)zirconium dichloride solution were introduced in a counterstream of argon into a 250 cm³ round-bottomed flask filled with argon. The zirconium concentration was $10^{-4}$ mol/dm³. The flask was kept at 30° C. in a thermostatically-controlled waterbath, and 13.6 g of a very finely divided white powder were obtained after a reaction time of 90 hours. Debye-Scherrer photographs showed that the sample was highly crystalline. The viscosity number was determined as 30 cm³/g DSC measurements showed that the product did not melt below the decomposition point but that irreversible conversion occurred from 130° C. The density of the homopolymer was 1.104 g/cm³ (at 23° C. in a gradient column). CP-MAS solid NMR spectra showed that both cis and trans linkages of the cyclopentene units were present.

EXAMPLE 4

The procedure was analogous to Example 3, but with the modification that 50 cm³ of cycloheptene and a zirconocene concentration of $2 \times 10^{-4}$ mol/dm³ were used. After a reaction time of 19 hours, 8.9 g of a very fine white powder were obtained. The polycycloheptene obtained had substantially comparable properties to the polycyclopentene described in Example 3.

EXAMPLE 5

A 1 liter glass autoclave was heated in vacuo, flushed several times and kept at $-30°$ C. by means of a thermostat, and filled with 150 cm³ of toluene, 100 cm³ of cyclopentene and 300 mg of aluminoxane in a counterstream of argon. The ethylene was injected at a pressure of 2 bar and saturation was awaited. The ethylene:cyclopentene molar ratio was 1:15.3. 1 cm³ of rac-ethylene(bisindenyl)zirconium dichloride dissolved in toluene was then added via a pressure-equalizing lock, and the concentration was then $7.4 \times 10^{-7}$ mol/dm³ of Zr in the reaction solution. The polymerization commenced immediately with clouding of the reaction batch. After a reaction duration of 45 minutes, the excess pressure was released and the batch was quenched using ethanol. Catalyst residues were removed by stirring with HCl solution, and the polymer was filtered off under suction, washed and subsequently dried to constant weight at 60° C.

The yield of white, pulverulent ethylene-cyclopentene copolymer was 11.4 g, which corresponds to an activity of 19,200 g of copolymer/mol of $Zr \times s$. The viscometrically determined molecular weight $M_w$ was 104,000 g/mol and the GPC measurement gave a $M_w/M_n$ value of 3.5. The incorporation rate of cycloolefin, determined by $^{13}C$ NMR spectroscopy, gave a value of 4 mol % of cyclopentene in the copolymer. Melting point 106.5° C.

EXAMPLE 6

The polymerization was carried out analogously to Example 5, with the modification that a temperature of $-10°$ C., a Zr concentration of $6.4 \times 10^{-6}$ mol/dm³ of Zr and a pressure of 1.25 bar of ethylene, in order to keep the initial molar ratio constant, were used. After a reaction time of 150 minutes, 3.5 g of copolymer were obtained; $M_n$ 223,000 g/mol; incorporation rate of cyclopentene in the copolymer 6.1%; melting point 88.1° C.; $M_w/M_n = 3.7$.

EXAMPLE 7

The polymerization was carried out analogously to Example 5, but at a zirconium concentration of $4.0 \times 10^{-6}$ mol/dm³ and an ethylene:cyclopentene molar ratio of 1:11.7. After a reaction time of 45 minutes, at an activity of 4,100 g of copolymer/mol of Zr.s, 24.5 g of a dripping product, which was swollen in the moist state, and an elastic polymer which was white in the dry state and contained 18 mol % of cyclopentene were obtained. Besides signals for randomly distributed comonomer, the $^{13}C$ NMR spectrum also exhibited signals for cyclopentene sequences in the copolymer. The ratio was about 70:30 mol %. The molecular weight had a value of 20,000, and the molecular weight distribution was $M_w/M_n = 3.5$.

EXAMPLE 8

The procedure used was analogous to Example 5. However, a zirconium concentration of $1.5 \times 10^{-5}$ mol/dm³ and an ethylene:cyclopentene molar ratio of 1:10.8 were used. The yield was 27.0 g at an activity of 1,750 g of copolymer/mol of Zr.s. The molecular weight had a value of 20,000, the incorporation rate was 28 mol %, and the molecular weight distribution was $M_w/M_n = 3.6$.

EXAMPLE 9

The polymerization was carried out analogously to Example 5. However, the cycloolefin used was cycloheptene, and the catalyst concentration was increased to $7.4 \times 10^{-6}$ mol/dm³ of Zr in order to obtain an activity of 2,160 g of copolymer/mol of Zr.s. After a polymerization time of 45 minutes, the yield was 8.7 g. The incorporation rate of cycloheptene was, as 3.0 mol %, less than in the case of cyclopentene in Example 3. The molecular weight was determined as 21,000.

EXAMPLE 10

The polymerization was carried out analogously to Example 5, with the modification that the cycloolefin employed was cyclooctene. At a catalyst concentration of $3.7 \times 10^{-5}$ mol/dm³ of Zr, a yield of 14.7 g was achieved at an activity of 1,500 g of copolymer/mol of Zr.s. The incorporation rate was 1.2 mol %, and the mean molecular weight was 2,000. The melting point of the copolymer dropped to 118.2° C.

We claim:

1. A homopolymer or copolymer containing 80 to 100 mol-% repeating cyclic units derived from a cycloolefin monomer, the balance of up to 20 mol-% of the repeating units, in the case of a copolymer, being derived from at least one linear monomer selected from the group consisting a $C_2$—to $C_{28}$—1—olefin and a $C_4$—to $C_{28}$—diolefin, said copolymer having a polydispersity, $M_w/M_n$ ranging in value from 2.9 to 6.0.

2. A homopolymer or copolymer as claimed in claim 1, containing 90 to 100% repeating cyclic units derived from a monomer of the formula

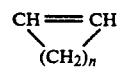

in which n is a number from 2 to 10.

3. A copolymer according to claim 2 containing up to 10 mol-% repeating units derived from a $C_2$ to $C_6$ 1—olefin or a $C_4$ to $C_{12}$—diolefin.

4. A crystalline isotactic polycyclopentene, comprising repeating cyclopentene units in which the monomer rings are fully retained, said polycyclopentene having a melting point above 250° C.

* * * * *